United States Patent
Liu et al.

(10) Patent No.: US 11,281,056 B2
(45) Date of Patent: Mar. 22, 2022

(54) DISPLAY SUBSTRATE, DISPLAY DEVICE AND METHOD FOR MANUFACTURING DISPLAY SUBSTRATE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Xingyi Liu, Beijing (CN); Jideng Zhou, Beijing (CN); Ran Zhang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 110 days.

(21) Appl. No.: 16/639,995

(22) PCT Filed: Sep. 10, 2019

(86) PCT No.: PCT/CN2019/105054
§ 371 (c)(1),
(2) Date: Feb. 18, 2020

(87) PCT Pub. No.: WO2020/082922
PCT Pub. Date: Apr. 30, 2020

(65) Prior Publication Data
US 2021/0018801 A1    Jan. 21, 2021

(30) Foreign Application Priority Data

Oct. 25, 2018 (CN) .......................... 201811252153.X

(51) Int. Cl.
*G02F 1/1368* (2006.01)
*G02F 1/1343* (2006.01)
(Continued)

(52) U.S. Cl.
CPC ...... *G02F 1/134309* (2013.01); *G02F 1/1368* (2013.01); *G02F 1/13378* (2013.01); *G02F 1/136286* (2013.01)

(58) Field of Classification Search
CPC ............................................... G02F 1/134309
See application file for complete search history.

(56) References Cited

U.S. PATENT DOCUMENTS

2016/0041442 A1* 2/2016 Chen ..................... G02F 1/1345 257/72
2017/0038903 A1* 2/2017 Sun ..................... G06F 3/04184

FOREIGN PATENT DOCUMENTS

CN    101369077 A    2/2009
CN    103969859    *  8/2014   ............. G02F 1/133
(Continued)

*Primary Examiner* — Sang V Nguyen
(74) *Attorney, Agent, or Firm* — The Webb Law Firm

(57) ABSTRACT

The present disclosure relates to a display substrate, a display device, and a method for manufacturing a display substrate. The display substrate having a display area and a non-display area, includes: a common electrode layer located in the non-display area; a common electrode line located in the non-display area; and a plurality of bar-shape via holes located in the non-display area; wherein the plurality of bar-shape via holes extend in a direction away from the display area, and the common electrode layer is electrically connected to the common electrode line through the plurality of bar-shape via holes.

13 Claims, 3 Drawing Sheets

(51) Int. Cl.
*G02F 1/1337* (2006.01)
*G02F 1/1362* (2006.01)

(56) References Cited

FOREIGN PATENT DOCUMENTS

| | | |
|---|---|---|
| CN | 103969859 A | 8/2014 |
| CN | 104777650 A | 7/2015 |
| CN | 105655360 A | 6/2016 |
| CN | 106444187 A | 2/2017 |
| CN | 107085324 A | 8/2017 |
| CN | 107479235 A | 12/2017 |
| CN | 108227323 A | 6/2018 |
| CN | 109212845 A | 1/2019 |
| KR | 1020130048059 A | 5/2013 |

* cited by examiner

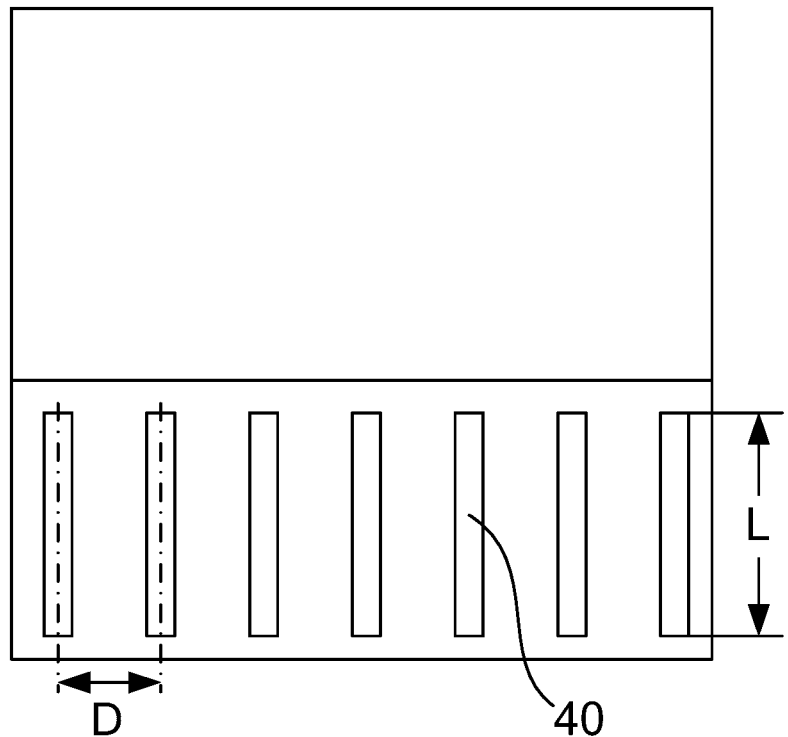

Fig. 6 providing a display substrate including a display area and a non-display area, wherein the non-display area includes a common electrode layer, a common electrode line, and a plurality of bar-shape via holes that extend in a direction away from the display area and connect the common electrode layer to the common electrode line ~100 spraying an alignment liquid on the display area to form an alignment film layer ~200

Fig. 7

DISPLAY SUBSTRATE, DISPLAY DEVICE AND METHOD FOR MANUFACTURING DISPLAY SUBSTRATE

CROSS-REFERENCE TO RELATED APPLICATIONS

The present application is a U.S. National Stage Application under 35 U.S.C. § 371 of International Patent Application No. PCT/CN2019/105054, filed on Sep. 10, 2019, which is based on and claims priority to CN Patent Application No. 201811252153.X filed on Oct. 25, 2018, the disclosure of both which are incorporated by reference herein in its entirety.

TECHNICAL FIELD

The present disclosure relates to the field of display, and in particular, to a display substrate, a display device, and a method for manufacturing a display substrate.

BACKGROUND

In small-sized liquid crystal display products, a coating machine is mainly applied to form an alignment film layer in such a manner as coating an alignment liquid. Considering a low efficiency of such coating manner, in order to improve the production capacity in the related art, the coating manner is replaced by a spraying manner using a spraying machine.

SUMMARY

In one aspect of the present disclosure, a display substrate having a display area and a non-display area is provided. The display substrate includes: a common electrode layer located in the non-display area; a common electrode line located in the non-display area; and a plurality of bar-shape via holes located in the non-display area; wherein the plurality of bar-shape via holes extend in a direction away from the display area, and the common electrode layer is electrically connected to the common electrode line through the plurality of bar-shape via holes.

In some embodiments, the plurality of bar-shape via holes are parallel to each other with a same distance between every two adjacent bar-shape via holes among the plurality of bar-shape via holes.

In some embodiments, the distance is 30 to 150 µm.

In some embodiments, at least one of the plurality of bar-shape via holes has an end in a taper shape or a streamline shape on one side adjacent to the display area.

In some embodiments, both lateral lines of an aperture of at least one of the plurality of bar-shape via holes extending in a length direction are straight lines and parallel to each other.

In some embodiments, the display substrate further includes: a gate, a source, and a drain which are located in the display area, and wherein the common electrode line is in the same layer and of the same material as the gate, or in the same layer and of the same material as the source and the drain.

In some embodiments, the display substrate further includes a plurality of data signal lines located in the non-display area, and wherein the plurality of bar-shape via holes are parallel to the plurality of data signal lines and arranged at intervals along a direction parallel to an edge line on one side of the display area adjacent to the non-display area.

In some embodiments, the display substrate further includes an alignment film layer which covers the display area, extends to the non-display area and at least partially covers the common electrode layer formed within the plurality of bar-shape via holes.

In some embodiments, each of the plurality of bar-shape via holes has a length of 90 to 450 µm.

In some embodiments, each of the plurality of bar-shape via holes has a width of 3 to 8 µm.

In some embodiments, the display substrate further includes a plurality of data signal lines located in the non-display area, wherein the plurality of bar-shape via holes are parallel to the plurality of data signal lines and arranged at intervals along a direction parallel to an edge line on one side of the display area adjacent to the non-display area; both lateral lines of an aperture of at least one of the plurality of bar-shape via holes extending in a length direction are straight lines and parallel to each other; the display substrate includes an alignment film layer which covers the display area, extends to the non-display area and at least partially covers the common electrode layer formed within the plurality of bar-shape via holes; and each of the plurality of bar-shape via holes has a length of 90 to 450 µm and a width of 3 to 8 µm.

In some embodiments, the display substrate includes a thin film transistor liquid crystal display substrate, which includes: a passivation, a gate insulator, and a substrate, wherein the common electrode layer, the passivation, the gate insulator, the common electrode line and the substrate are sequentially arranged along a first direction, and the plurality of bar-shape via holes are provided within the passivation and the gate insulator; the display area of the thin film transistor liquid crystal display substrate further includes a gate, a source, and a drain, wherein the common electrode line is provided in the same layer and made from the same material as the gate, or provided in the same layer and made from the same material as the source and the drain.

In another aspect of the present disclosure, a method for manufacturing a display substrate is provided. The method for manufacturing a display substrate includes: providing a display substrate having a display area and a non-display area, wherein the display substrate includes a common electrode layer, a common electrode line, and a plurality of bar-shape via holes, wherein the common electrode layer common electrode line, and a plurality of bar-shape via holes are located in the non-display area, the plurality of bar-shape via holes extend in a direction away from the display area, and the common electrode layer is electrically connected to the common electrode line through the plurality of bar-shape via holes; and spraying an alignment liquid on the display area to form an alignment film layer.

In some embodiments, the step of spraying the alignment liquid includes: spraying the alignment liquid on the display area so that the alignment liquid sprayed on the display area flows from the display area to the non-display area, and is diffused in the non-display area toward one side away from the display area via the plurality of bar-shape via holes.

In another aspect of the present disclosure, a display device is provided. The display device includes: the display substrate as described previously.

BRIEF DESCRIPTION OF THE DRAWINGS

The accompanying drawings, which constitute a part of this specification, illustrate embodiments of the present disclosure, and together with this specification, serve to explain the principles of the present disclosure.

The present disclosure may be more clearly understood from the following detailed description with reference to the accompanying drawings, in which:

FIG. 6 is a schematic view showing dimensional parameters according to one embodiment of the display substrate of the present disclosure;

FIG. 7 is a schematic flowchart according to one embodiment of the method for manufacturing the display substrate of the present disclosure.

Figure 1:
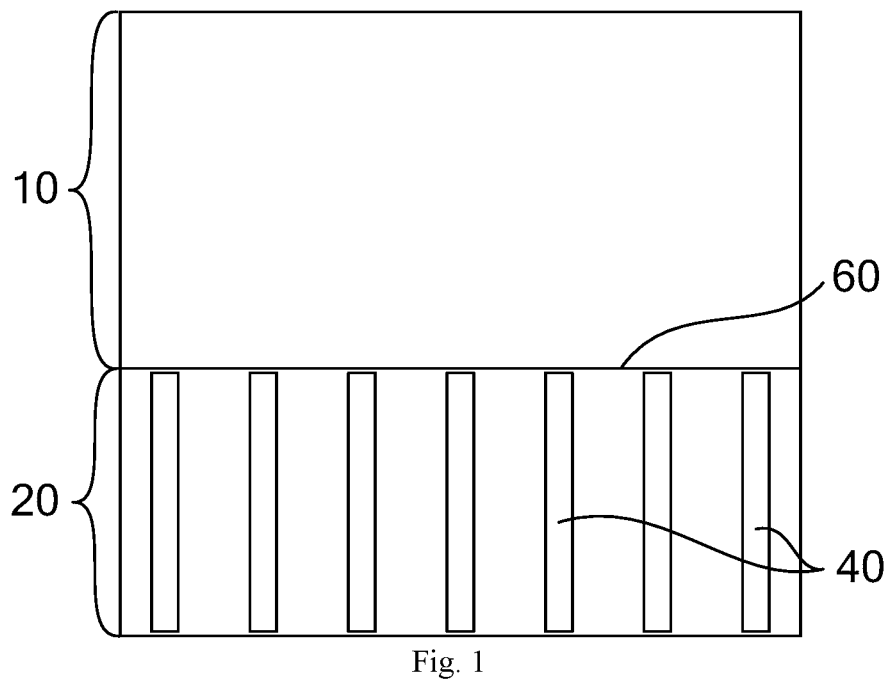
FIG. 1 is a schematic structural view according to one embodiment of the display substrate of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. Such similar words as "comprising/including" or "containing" mean that the element preceding the word encompasses the elements enumerated after the word, and does not exclude the possibility of encompassing other elements as well. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

After research, the inventors have found that, in some related arts, when a small-size display substrate is sprayed with an alignment liquid, a plurality of round holes or square via holes provided in a common electrode area adjacent to a display area of the display substrate may impede outward diffusion of the alignment liquid, while the alignment liquid that has not been diffused flows back to the display area, which may cause that the display area has a greater edge thickness, thereby resulting in mura. Mura here refers to a trace phenomenon caused by uneven display brightness.

In view of this, the embodiments of the present disclosure provide a display substrate, a display device, and a method for manufacturing a display substrate, which can improve the diffusion state of the alignment liquid at a periphery of the display substrate.

FIG. 1 is a schematic structural view according to one embodiment of the display substrate of the present disclosure.

Referring to FIG. 1, in some embodiments, the display substrate 50 includes a display area 10 and a non-display area 20. The display area 10 refers to an AA area to implement image display, which includes a plurality of display pixels. The display area includes a common electrode layer and a common electrode line. The non-display area includes the common electrode layer, the common electrode line, and a plurality of bar-shape via holes 40. The common electrode layer and the common electrode line are located in different layers and insulated by an insulating layer, wherein the plurality of bar-shape via holes 40 are provided in the insulating layer therebetween. The common electrode layer is electrically connected to the common electrode line through the plurality of bar-shape via holes 40. The length of the bar-shape via hole 40 is greater than the width of the bar-shape via hole 40.

In some embodiments, the common electrode layer is located on a front side of the common electrode line along a first direction which is a light emitting direction of the display area 10. The common electrode layers in the display area and the non-display area are provided with an alignment film layer. The alignment film layer covers the common electrode layer in the display area, extends from the common electrode layer in the display area to the common electrode layer in the non-display area, and covers the common electrode layer in the non-display area that is at least partially formed within the plurality of bar-shape via holes 40.

In FIG. 1, a plurality of strip-shaped via holes 40 which extend in a direction away from the display area 10, can guide the alignment liquid flowing from the display area to the non-display area to flow in a direction away from the display area 10, and form a film layer having a uniform thickness at a critical point between the display area and the non-display area. Compared with the round or the square via hole in the related art, the bar-shape via holes 40 can form a continuous drainage channel, which can not only eliminate obstacles to the flow of the alignment liquid, but also guide the alignment liquid to more rapidly diffuse the alignment liquid from the display area 10 to one side away from the display area 10. This effectively promotes the diffusion of the alignment liquid at a periphery of the display substrate, and prevents the alignment liquid of the non-display area 20 from flowing back to an edge of the display area 10 as much as possible, so that the cured alignment film layer has a more uniform thickness, thereby reducing or eliminating an abnormal phenomenon resulting from mura.

Referring to FIG. 1, in some embodiments, in order to promote the flow of the alignment liquid and reduce the obstacle during the flow of the alignment liquid, it is possible to allow both lateral lines of the aperture of at least one of the plurality of bar-shape via holes to be straight lines and parallel to each other. In other words, the bar-shape via hole 40 may be provided to be a straight bar-shape via hole. That is, both lateral lines of the aperture of the via hole are straight lines and parallel to each other, and the aperture of the entire bar-shape via hole may be formed to be a rectangle or a shape like a rectangle as shown in FIG. 1. In other embodiments, the aperture of the bar-shape via hole 40 may also be in the form of a via hole where both lateral lines are wave-like or fold-shaped.

In order to make a more uniform diffusion of the alignment liquid and avoid mura resulting from uneven diffusion, in some embodiments, a plurality of bar-shape via holes 40 may be provided to be parallel to each other, with the same distance between every two adjacent bar-shape via holes among the plurality of bar-shape via holes. In FIG. 1, the arrangement direction of the plurality of bar-shape via holes 40 parallel to each other may be parallel to an edge line 60 on one side of the display area 10 adjacent to the non-display area 20, so as to synchronously guide the alignment liquid at a position of the display area 10 adjacent to each bar-shape via hole 40.

In FIG. 1, there may a distance between an end on one side of the bar-shape via hole 40 adjacent to the display area 10 and the edge line 60, so as to avoid short-circuit of the common electrode signal of the bar-shape via hole 40 with the pixel signal in the display area 10. Further, the end on one side of the bar-shape via hole 40 adjacent to the display area 10 may be provided to be close to the edge line 60 of the display area 10 as much as possible without entering the display area 10.

Figure 2:
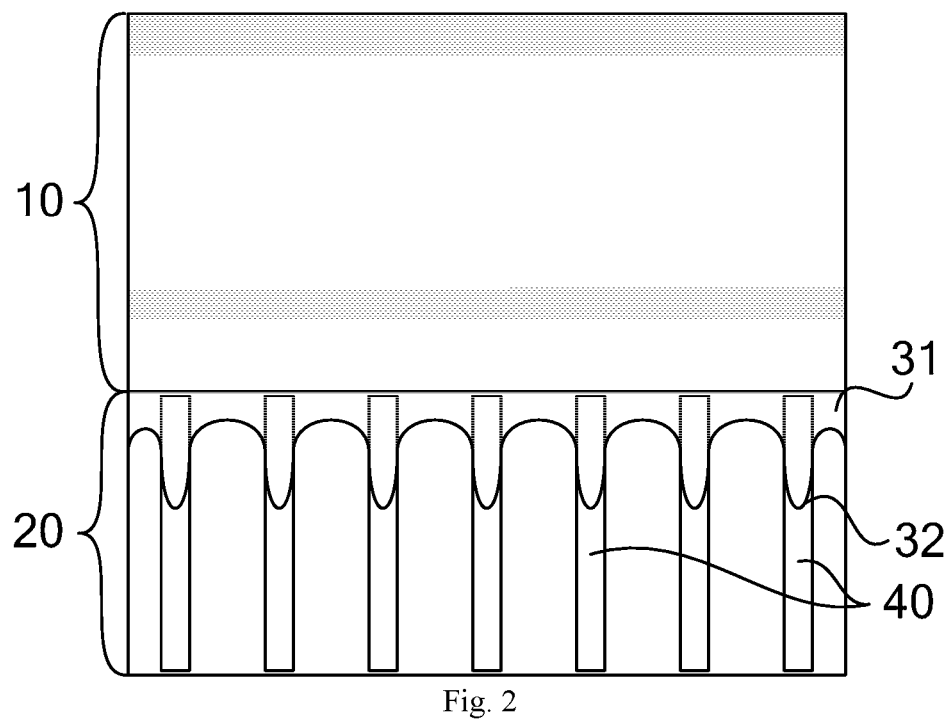
FIG. 2 is a schematic view showing flow of an alignment liquid when an alignment film layer is formed according to one embodiment of the display substrate of the present disclosure.

FIG. 2 is a schematic view showing flow of an alignment liquid when an alignment film layer is formed according to some embodiments of the display substrate of the present disclosure.

Referring to FIG. 2, the alignment liquid 31 after being sprayed on the display area 10 flows toward one side adjacent to the non-display area 20. When the alignment liquid 31 flows to the bar-shape via hole 40, the bar-shape via hole 40 may guide and accelerate the flow of the alignment liquid 31. In FIG. 2, compared with a location in which the bar-shape via hole 40 is not provided, the alignment liquid 31 flowing from the display area 10 to the non-display area 20 flows faster within the bar-shape via hole 40, with its flow position 32 farther from the display area 10. It can be seen that, the bar-shape via hole 40 not only does not impede the diffusion of the alignment liquid 31, but also can guide the alignment liquid 31 to flow outward rapidly.

Figure 3:
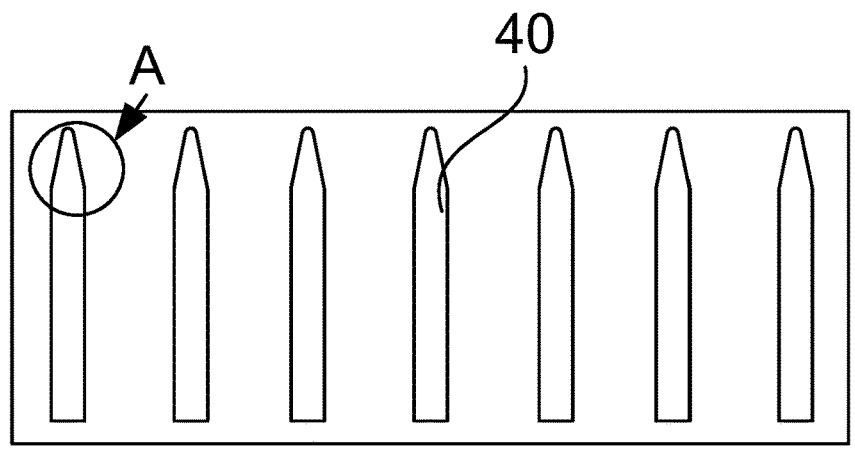
FIG. 3 is a schematic structural view of a non-display area according to another embodiment of the display substrate of the present disclosure.

FIG. 3 is a schematic structural view of a non-display area according to other embodiments of the display substrate of the present disclosure.

Referring to FIG. 3, in some embodiments, in order to allow the alignment liquid sprayed onto the display area 10 to enter the bar-shape via hole 40 more smoothly, it is possible to provide an end on one side of the bar-shape via hole 40 adjacent to the display area 10 which is formed in a taper shape. In other embodiments, it is also possible to provide an end on one side of the bar-shape via hole 40 adjacent to the display area 10 which is formed in a streamline shape, so as to accelerate the diffusion speed of the alignment liquid by a favorable guiding effect of a streamline shape on the alignment liquid.

Figure 4:
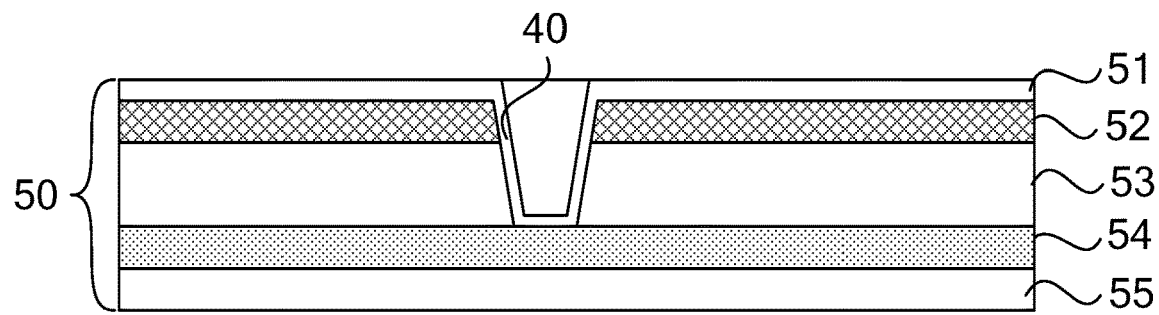
FIG. 4 is a schematic view of a cross-sectional structure according to one embodiment of the display substrate of the present disclosure.

FIG. 4 is a schematic view of a cross-sectional structure according to some embodiments of the display substrate of the present disclosure.

Referring to FIG. 4, in some embodiments, the display substrate includes a TFT-LCD (Thin Film Transistor-Liquid Crystal Display) substrate. The TFT-LCD substrate includes a common electrode layer 51 (e.g. Common electrode Indium Tin Oxides (Com ITO)), a passivation 52 (PVX), a gate insulator 53 (GI), a common electrode line 54 and a substrate 55, which are sequentially arranged along a first direction (e.g., a direction from top to bottom in FIG. 4). The plurality of bar-shape via holes 40 are disposed within the passivation 52 and the gate insulator 53. The display area of the TFT-LCD substrate may further include a gate, a source, and a drain. In some embodiments, the common electrode line 54 may be provided in the same layer as the gate of the display substrate and made from the same material as the gate of the display substrate. Correspondingly, when the gate is manufactured, the common electrode line may be formed by the same patterning process. In other embodiments, the common electrode line may also be provided in the same layer as the source and the drain and made from the same material as the source and the drain. Correspondingly, when the source and the drain are manufactured, the common electrode line may be formed by the same patterning process.

In some embodiments, the display substrate includes an alignment film layer. When the alignment film layer is formed, the alignment film layer may be formed in a spraying manner. Specifically, when the alignment liquid is sprayed onto the display area 10 through the nozzle, part of the alignment liquid of the display area 10 flows to the non-display area 20, and flows outward under the guidance of the bar-shape via hole 40. The alignment film layer may cover the display area, extend to the non-display area 20 and at least partially cover the common electrode layer formed within the plurality of bar-shape via holes 40.

Figure 5:
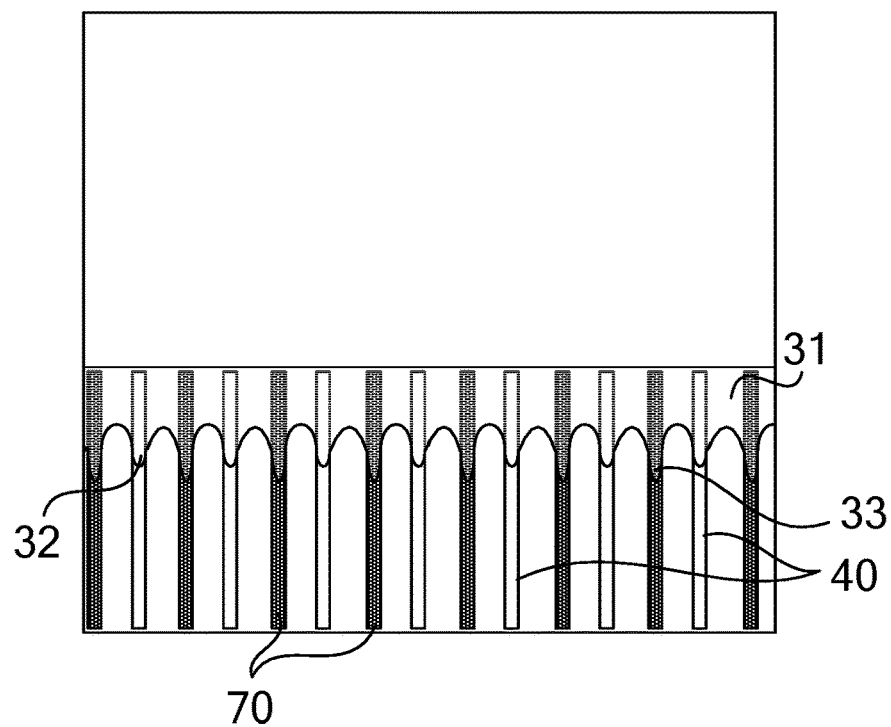
FIG. 5 is a schematic view showing flow of an alignment liquid when an alignment film layer is formed according to still another embodiment of the display substrate of the present disclosure.

FIG. 5 is a schematic view showing flow of an alignment liquid when an alignment film layer is formed according to still other embodiments of the display substrate of the present disclosure.

Referring to FIG. 5, in some embodiments, the TFT-LCD substrate further includes a plurality of data signal lines 70 located in the non-display area 20. Each data signal line 70 may correspond to a column of pixel units in the display area 10. When part of the alignment liquid 31 of the display area 10 flows to the common electrode area 20, in addition to the bar-shape via hole 40, the data signal line can also guide the flow of the alignment liquid 31. The plurality of bar-shape via holes 40 in FIG. 5 may be configured in such a form as to be parallel to the plurality of data signal lines 70 and arranged at intervals along a direction parallel to the edge line on one side of the display area adjacent to the non-display area so as to obtain a better drainage effect.

In FIG. 5, compared to a location in which the bar-shape via hole 40 and the data signal line 70 are not provided, the alignment liquid 31 flowing from the display area 10 to the common electrode area 20 is farther from the display area 10 both at the flow position 32 within the bar-shape via hole 40 and the flow position 33 on the data signal line 70, thereby effectively guiding the alignment liquid 31 to overflow outward rapidly. In other embodiments, two or more bar-shape via holes 40 may be provided between the data metal lines 70 respectively corresponding to two adjacent columns of display pixels.

FIG. 6 is a schematic view showing dimensional parameters according to some embodiments of the display substrate of the present disclosure.

Referring to FIG. 6, in some embodiments, a distance D between a plurality of bar-shape via holes 40 may be determined according to a width and length of the pixel unit in the display area 10. For example, the distance is 30 to 150 μm. The length L of the bar-shape via hole 40 depends on the coverage range of the common electrode layer within the non-display area 20. For example, the length is 90 to 450 μm. The width of the bar-shape via hole may be selected to be 3 to 8 μm.

The respective embodiments of the above-described display substrate may be applied to respective display devices. That is, the present disclosure provides a display device including a display substrate according to the foregoing embodiments.

FIG. 7 is a schematic flowchart according to some embodiments of a method for manufacturing the display substrate of the present disclosure.

Referring to FIG. 7, in some embodiments, the method for manufacturing a display substrate may include steps 100-200. In conjunction with FIGS. 1-6, in step 100, a display substrate including a display area 10 and a non-display area 20 is provided. The non-display area includes a common electrode layer 51, a common electrode line 54, and a plurality of bar-shape via holes 40. The bar-shape via holes 40 extend in a direction away from the display area 10, and the common electrode layer 51 is electrically connected to the common electrode line 54 through the plurality of bar-shape via holes 40.

Referring to FIG. 4, after the gate insulator 53 and the passivation 52 are formed on the layer where the common electrode line 54 is located, a bar-shape opening is etched in the gate insulator 53 and the passivation 52 to expose the common electrode line 54. A common electrode layer 51 is further formed on the passivation 52, and a metal layer may be deposited on the sidewall and the bottom surface of the bar-shape opening to form the bar-shape via hole 40 connecting the common electrode line 54 and the common electrode layer 51. The metal layer forming the bar-shape via hole 40 may also be formed by the same patterning process as the common electrode layer 51, and the material of the metal layer forming the bar-shape via holes 40 may be the same as the material of the common electrode layer 51.

In step 200, an alignment liquid 31 is sprayed on the display area 10 to form an alignment film layer. When the alignment liquid 31 is sprayed in step 200, the alignment liquid 31 sprayed on the display area 10 flows from the display area 10 to the non-display area 20, and flows in the non-display area towards one side away from the display area 10 via the plurality of bar-shape via holes 40. In this way, the alignment liquid 31 can be rapidly diffused in the non-display area 20, and the alignment liquid of the non-display area 20 is prevented from flowing back to the edge of the display area 10 as much as possible, so that the cured alignment film layer has a more uniform thickness, thereby reducing or eliminating an abnormal phenomenon resulting from mura.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A display substrate having a display area and a non-display area, comprising:
    a common electrode layer located in the non-display area;
    a common electrode line located in the non-display area; and
    a plurality of bar-shape via holes located in the non-display area;
    wherein the plurality of bar-shape via holes extend in a direction away from the display area, the common electrode layer is electrically connected to the common electrode line through the plurality of bar-shape via holes, and at least one of the plurality of bar-shape via holes has an end in a taper shape or a streamline shape on one side adjacent to the display area.

2. The display substrate according to claim 1, wherein the plurality of bar-shape via holes are parallel to each other, with a same distance between every two adjacent bar-shape via holes among the plurality of bar-shape via holes.

3. The display substrate according to claim 2, wherein the distance is 30 to 150 μm.

4. The display substrate according to claim 1, wherein both lateral lines of an aperture of at least one of the plurality of bar-shape via holes extending in a length direction are straight lines and parallel to each other.

5. The display substrate according to claim 1, further comprising: a gate, a source, and a drain which are located in the display area, and wherein the common electrode line is in the same layer and of the same material as the gate, or in the same layer and of the same material as the source and the drain.

6. The display substrate according to claim 1, further comprising a plurality of data signal lines located in the non-display area, and wherein the plurality of bar-shape via holes are parallel to the plurality of data signal lines and arranged at intervals along a direction parallel to an edge line on one side of the display area adjacent to the non-display area.

7. The display substrate according to claim 1, further comprising an alignment film layer which covers the display area, extends to the non-display area and at least partially covers the common electrode layer formed within the plurality of bar-shape via holes.

8. The display substrate according to claim 1, wherein each of the plurality of bar-shape via holes has a length of 90 to 450 µm.

9. The display substrate according to claim 1, wherein each of the plurality of bar-shape via holes has a width of 3 to 8 µm.

10. The display substrate according to claim 3, further comprising a plurality of data signal lines located in the non-display area, wherein the plurality of bar-shape via holes are parallel to the plurality of data signal lines and arranged at intervals along a direction parallel to an edge line on one side of the display area adjacent to the non-display area; both lateral lines of an aperture of at least one of the plurality of bar-shape via holes extending in a length direction are straight lines and parallel to each other; the display substrate comprises an alignment film layer which covers the display area, extends to the non-display area and at least partially covers the common electrode layer formed within the plurality of bar-shape via holes; and each of the plurality of bar-shape via holes has a length of 90 to 450 µm and a width of 3 to 8 µm.

11. The display substrate according to claim 10, wherein the display substrate comprises a thin film transistor liquid crystal display substrate, which further comprises: a passivation, a gate insulator, and a substrate, wherein the common electrode layer, the passivation, the gate insulator, the common electrode line and the substrate are sequentially arranged along a first direction, and the plurality of bar-shape via holes are provided within the passivation and the gate insulator; the display area of the thin film transistor liquid crystal display substrate further comprises a gate, a source, and a drain, wherein the common electrode line is provided in the same layer and made from the same material as the gate, or provided in the same layer and made from the same material as the source and the drain.

12. A method for manufacturing a display substrate comprising:
providing a display substrate having a display area and a non-display area, wherein the display substrate comprises a common electrode layer, a common electrode line, and a plurality of bar-shape via holes, wherein the common electrode layer, common electrode line, and a plurality of bar-shape via holes are located in the non-display area, the plurality of bar-shape via holes extend in a direction away from the display area, and the common electrode layer is electrically connected to the common electrode line through the plurality of bar-shape via holes; and
spraying an alignment liquid on the display area to form an alignment film layer,
wherein the step of spraying the alignment liquid comprises:
spraying the alignment liquid on the display area so that the alignment liquid sprayed on the display area flows from the display area to the non-display area and is diffused in the non-display area toward one side away from the display area via the plurality of bar-shape via holes.

13. A display device comprising:
the display substrate according to claim 1.

* * * * *